United States Patent [19]

Schmid-Welti

[11] Patent Number: 4,612,950

[45] Date of Patent: Sep. 23, 1986

[54] PRESSURE MEASURING AND REGULATING DEVICE

[75] Inventor: Erich Schmid-Welti, Langwiesen, Switzerland

[73] Assignee: Schmid-Welti AG, Langwiesen, Switzerland

[21] Appl. No.: 711,379

[22] Filed: Mar. 13, 1985

[30] Foreign Application Priority Data

Mar. 13, 1984 [CH] Switzerland .......................... 1256/84

[51] Int. Cl.⁴ ............................................ G05D 16/06
[52] U.S. Cl. .................................. 137/116.5; 137/489; 137/883
[58] Field of Search .................. 137/116.5, 489, 489.5, 137/883

[56] References Cited

U.S. PATENT DOCUMENTS

| | | | |
|---|---|---|---|
| 2,806,481 | 9/1957 | Faust | 137/116.5 |
| 3,115,147 | 12/1963 | Mueller | 137/489.5 X |
| 3,234,956 | 2/1966 | Stickle | 137/116.5 |
| 3,260,278 | 7/1966 | Lund | 137/343 |
| 3,762,435 | 10/1973 | Auwerter | 137/505.22 X |
| 4,060,370 | 11/1977 | Fleer | 137/489.5 X |

Primary Examiner—Robert G. Nilson
Attorney, Agent, or Firm—Fay, Sharpe, Fagan, Minnich & McKee

[57] ABSTRACT

In order to attain a modestly dimensioned device with small height, comprising two pressure regulators for supplying two independently regulated adjustable pressures from line pressure, the two regulators are divided into two functional units arranged laterally side by side. The first unit comprises a first valve chamber, the second unit a second valve chamber which act together to regulate the output pressure with manually adjustable control means. Line pressure supply line and pressure issue line of each unit are arranged in line with said valve chambers arranged side by side. The issue lines are connected to a measurement selector switch by which each of the units can be connected separately with measurement means. Further, independent measurement connections are provided. The described arrangement allows a compactly formed device in a box-shaped block.

17 Claims, 4 Drawing Figures

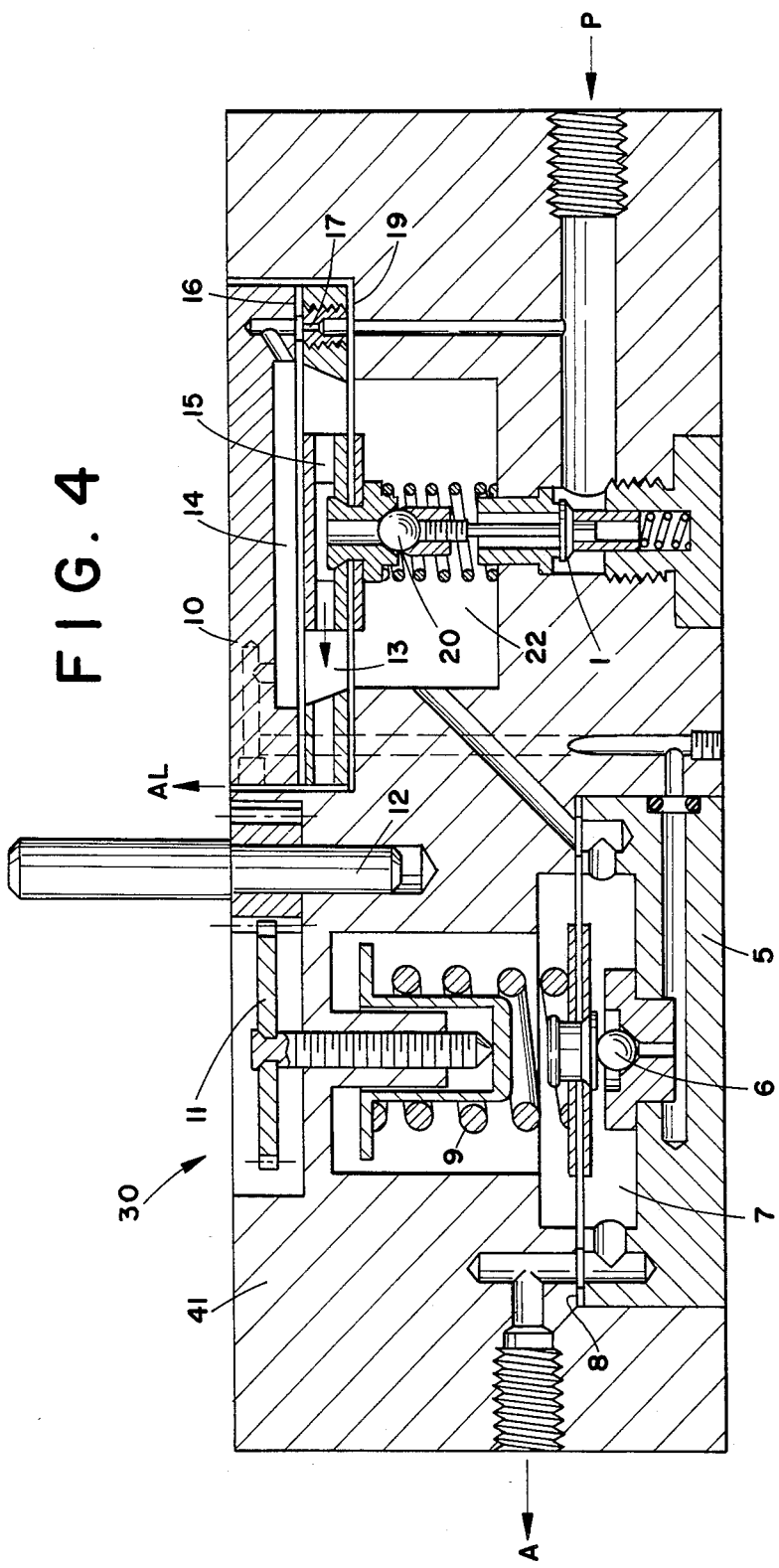

PRESSURE MEASURING AND REGULATING DEVICE

BACKGROUND OF THE INVENTION

1. Field of the Invention

This invention relates to a pressure metering and regulating device having (a) connections for line pressure and at least for one adjustable regulated pressure, (b) pressure measuring means and (c) at least one pressure regulator comprising a line pressure supply line, a regulated pressure issue line, manually operated control means for adjusting said regulated pressure and two interacting valve chambers, whereby said first valve chamber is a regulator chamber connected either with the line pressure supply line or an outlet, depending on the regulated pressure, and said second valve chamber is a control chamber connected to said control means for adjusting said regulated pressure.

2. Description of the Prior Art

Such devices are well known in the art. They serve as pressure pick off for adjustable reference pressures and as pressure meters for gaseous media. Until now such devices have been known as space consuming metering cases or slide-in units for laboratory systems, but not as hand-held devices in the so-called "multi-tester size" for mobile use.

The dimensions of the known devices, specially in the height, were given by the size of the pressure regulator, the valve chambers of which were coaxially mounted together with the control means.

SUMMARY OF THE INVENTION

Hence, it is an object of the present invention to provide a pressure measuring and regulating device in the form of a hand-held device of small size and in particular with reduced height.

According to the present invention this object is met by a device, characterized in that said valve chambers of said pressure regulator are laterally arranged side by side to attain less overall height and said line pressure supply line connects on the regulator chamber side and said issue line connects on the control chamber side or on the regulator chamber side.

Thereby two pressure regulators can be arranged in parallel in a space saving way and two reference pressures can be generated independently at the same time. Each pressure regulator can be connected separately with said pressure measuring means by a measurement selector switch to adjust and check the pressure without affecting the other pressure regulator. The central arrangement of said measurement selector switch between the two pressure regulator units and said pressure measuring means leads to a space saving arrangement.

BRIEF DESCRIPTION OF THE DRAWINGS

A special embodiment of the present invention will now be described by way of example and with reference to the accompanying drawings, in which

FIG. 4 shows a detailed sectional view of the pressure regulator.

DESCRIPTION OF THE PREFERRED EMBODIMENTS

Figure 1:
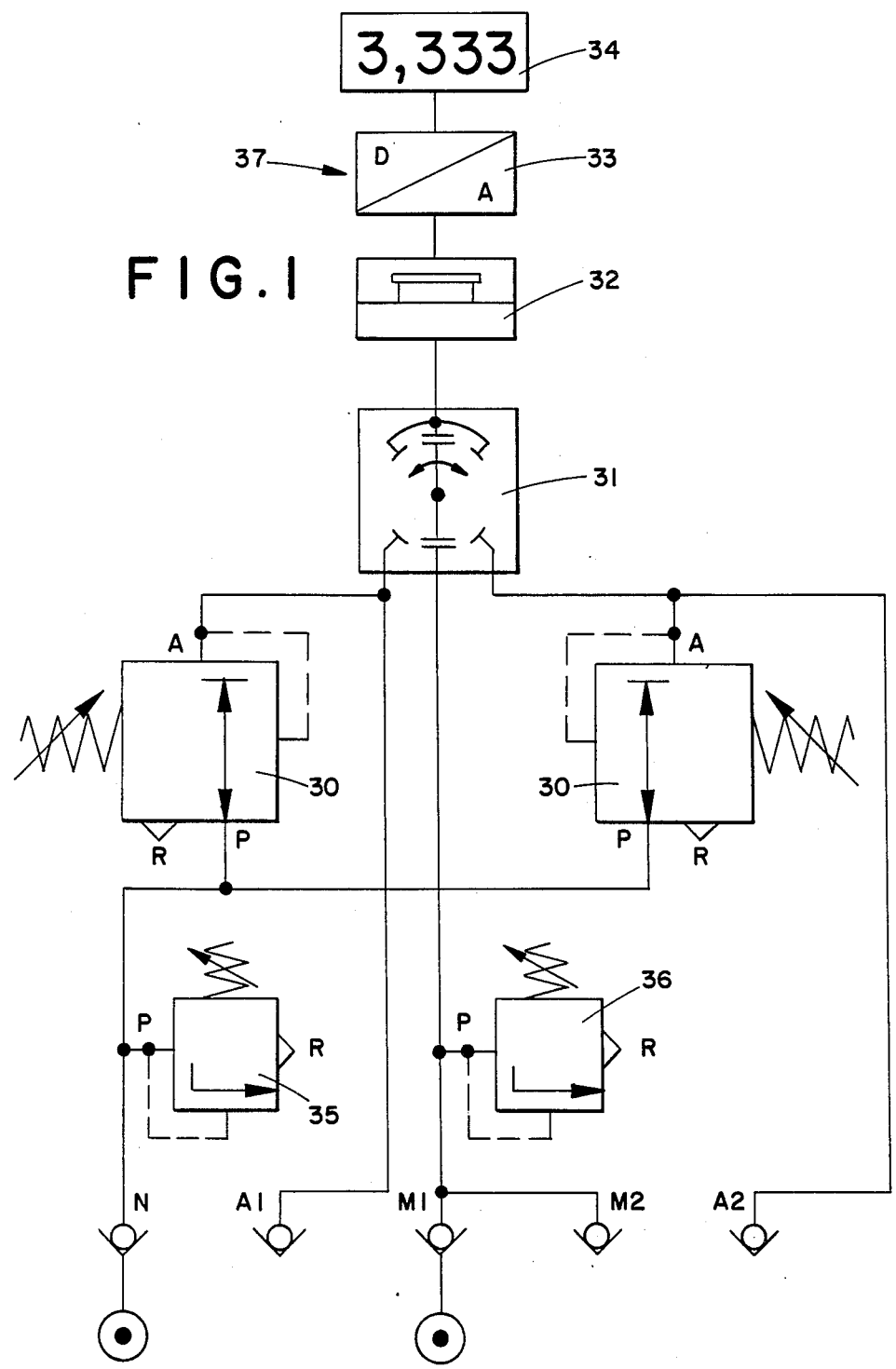
FIG. 1 is a schematic diagram of the device.

With reference to FIG. 1, the construction of the pressure measuring and regulating device will be described in principle. The device comprises a line pressure connection N for the connection of a line pressure supply to the device, whereby this line supply needs not to be stabilized but needs to have a pressure value above the adjustable regulated pressure. A first safety valve 35 with adjustable threshold value is connected to the line pressure input. Line pressure connection N is connected with two pressure regulators 30 arranged in parallel to each other, which are of identical general construction, but which could be adjustable within different pressure ranges. The pressure regulators 30 allow the manual adjustment of a selected pressure within the corresponding range. The regulated pressure essentially depends only from the selected adjusted value on the pressure regulator 30, the construction of which will be explained in detail below with reference to FIGS. 3 and 4. The regulated pressure issue lines A of the pressure regulators 30 are connected to a central measurement selector switch 31 on the one hand and with connections A1 and A2 for taking off regulated pressure on the other hand. By choice, measurement selector switch 31 connects the regulated pressure line or measurement connections M1, and M2, respectively, with pressure measuring means 37, comprising a pressure transducer 32, which signals are converted to digital values in an analog/digital converter 33 and are displayed on a digital display 34. Such measuring means are well known to someone skilled in the art and are also commercially available. According to the position of the measurement selector switch 31, the regulated pressure available at connection A1 or A2 is displayed, whereby both pressure regulators 30 can be manually adjusted precisely to a desired pressure value. A third position of measurement selector switch 31 connects the measuring means 37 directly with measuring connections M1 and M2. On the one hand this allows calibration of the pressure measuring means 37, and on the other hand, pressures of external pressure sources can be measured independently from the pressure regulation. A safety valve 36 is connected to the pressure measuring line as well.

Figure 2:
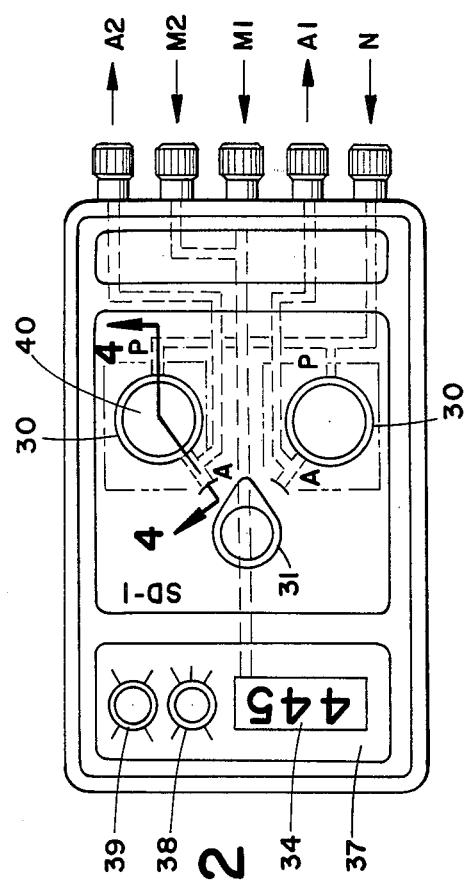
FIG. 2 is a top view of the device with schematically marked pressure lines.

With reference to FIG. 2 the described structure is shown in a top view of a concrete design of the device. Essentially the device is box-shaped like known multimeters for electrical measurements. Connections N, A1, A2, M1, M2 are arranged side by side on the lower narrow side of the device and are connected with the above described elements by pressure lines schematically shown in FIG. 2. Each of said two pressure regulators 30 comprises a rotary knob 40 as adjusting means arranged on the top side of the case of the device. The upper part of the device is arranged to hold a unit construction which is formed by measuring means 37. In particular the measuring unit comprises a digital display 34, a range switch 38 to alter the display sensitivity and a function switch 39 for turning the device on and off, for checking the batteries etc.

The measuring means 37 can be built in and removed as a unit. The device shown in FIG. 2 has only a modest height according to the multitester shape. Essentially the total height is defined by the arrangement of the pressure regulators 30, which will be described when referring to FIGS. 3 and 4. To begin with and referring to FIG. 3 the generally known principle of function will be briefly discussed. Essentially there are provided for two valve chambers 7, 22 having three valves 1, 20 and 6 taken altogether. The first valve chamber 22 comprises an inlet valve 1 and a vent valve 20, the second valve chamber 7 has an adjustable pressure equalization valve 6. At rest, i.e. without compressed air, inlet valve 1 and pressure equalization valve 6 are closed whereas vent valve 20 is open.

Connection N of the regulator is then connected to the compressed air line. Line pressure acts on the inlet valve 1 and is also fed to input pressure chamber 14 via inlet nozzle 17 for slower pressure buildup, and acts on a first regulator chamber diaphragm 19 and a second regulator chamber diaphragm 16 forcing them downwards. The diaphragms are mechanically coupled by a connecting ring 15. Thereby the vent valve 20 is forced shut and the inlet valve 1 is opened. Compressed air then is admitted into the first valve chamber 22, referred to as the regulator chamber, and from there via a connecting line into the second valve chamber 7, referred to as the control chamber. As soon as the force adjusted by a pressure regulator spring 9 is compensated for by counterpressure in control chamber 7, pressure equalization valve 6 will be opened by control chamber diaphragm 8 and pressure will be equalized between input pressure chamber 14 and both valve chambers 22 and 7, i.e. the diaphragms 19, 16 move upwards, inlet valve 1 is closed and vent valve 20 is opened. Therefore the pressure in the regulator chamber is reduced by exhausting air via outlet AL until pressure equalization valve 6 has been closed again by pressure regulator spring 9. Input valve 1 will then be opened again and the cycle repeats.

The stabilized pressure A adjusted by rotating knob 40 will be taken from the first valve chamber via second valve chamber 7.

Figure 3:
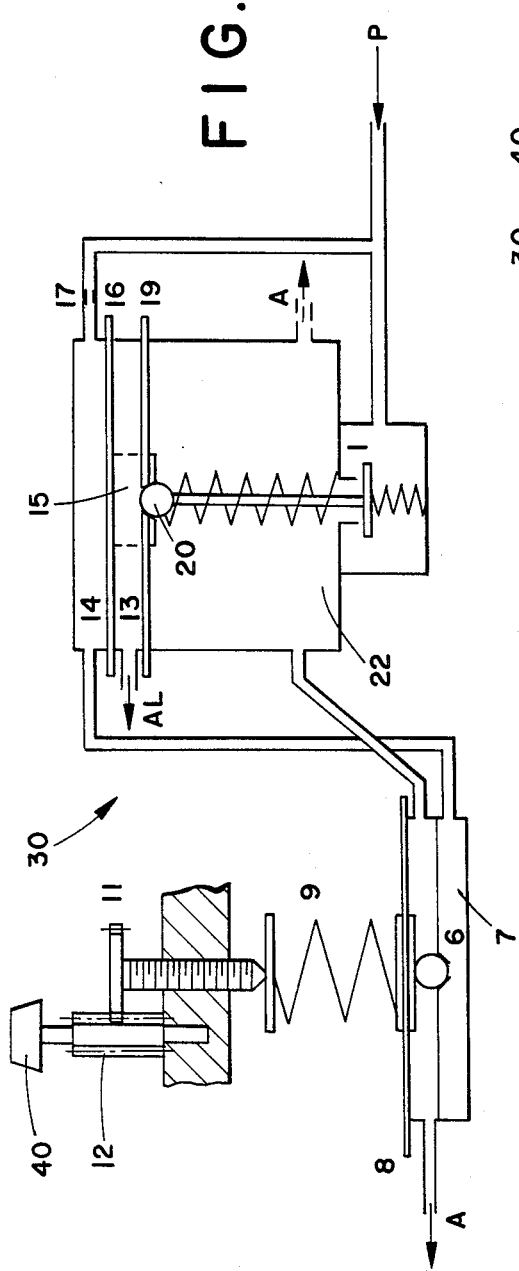
FIG. 3 is a functional schematic view of a pressure regulator.

The small total height of the pressure regulator 30, as can be seen from FIG. 3 and in particular from FIG. 4, is due to the lateral arrangement of valve chambers 22 and 7 and the thereby simplified arrangement of the supply lines and outlet lines, whereby the line pressure supply line p is connected on the regulator chamber side and the outlet for regulated pressure A is connected to the control chamber side. Thereby it is provided for what could be called a linear arrangement of the pressure regulator. For reducing the length of the device, the regulator diaphragms 16, 19 on the one hand and the control diaphragm 8 on the other hand are arranged side by side in displaced parallel planes. Thereby the control chamber diaphragm 8 is displaced towards the bottom of the case and the regulator chamber diaphragms 16, 19 are displaced towards the top of the case. The respective valve chambers 7, 22 can be reached from the bottom or top of the case by removing valve chamber caps 5 or 10, respectively, (FIG. 4). By this arrangement it is possible to have the case 41 formed by a solid block with the appropriate openings and drill holes. Preferably the block consists of aluminum.

The pressure adjustment of regulator 30 is effected by a rotating knob 40 as mentioned above. The control means comprises an axially adjustable turn threaded element 11, by which the initial tension in the pressure regulator spring 9, acting via diaphragm 8 on valve 6, can be set. The rotating knob 40 is mounted atop of an axially fixed cam 12, which is rotatably supported in the case 41 between the two valve chambers. Cam 12 is not arranged coaxially to the turn threaded element 11 but is driving the threaded element via a pinion on the cam 12 and a gear wheel fixed on a screw section of the threaded element. By this arrangement a reduction ratio can easily be attained which allows precise adjustment of each pressure regulator 30. Further, upon adjusting the pressure the rotating knob 40 is not displaced along its longitudinal axis. Thereby, the stroke of the threaded element 11, which should be long to assure a broad range of adjustment, has no influence on the total height of the device. By specifying different pressure regulator springs 9 the two pressure regulators 30 can be provided with different pressure ranges. By dividing each pressure regulator 30 in two functional blocks arranged side by side, the described pressure measuring and regulating device has the advantage of small total height. The pressure adjustment is effected with a reduction gearing, whereby on the one hand the rotating knobs 40 are axially fixed and do not alter the total height and on the other hand an exact adjustment of the pressure is easily possible.

The compact arrangement comprising two parallel arranged pressure regulators 30, a pneumatic measurement selector switch 31, two safety valves 35, 36 and an electronic pressure meter 37 combined in a single block lead to a device with small dimensions.

While there are shown and described present preferred embodiments of the invention, it is to be distinctly understood that the invention is not limited thereto, but may be otherwise variously embodied and practiced within the scope of the following claims.

I claim:

1. A pressure metering and regulating device comprising:
    a case formed by a unitary block; and,
    at least one pressure regulator positioned in said case and comprising:
    a line pressure supply line,
    a regulated pressure issue line,
    an outlet line,
    manually operated control means for adjusting a regulated pressure setting, and
    first and second interconnected valve chambers recessed into said block, said first valve chamber being a regulator chamber connected with one of the line pressure supply line and the outlet line, depending on the setting of said manually operated control means, said second valve chamber being a control chamber operable connected to said manually operated control means for adjusting said regulated pressure, wherein said valve chambers of said pressure regulator are positioned side by side in said case to attain less overall height and wherein said line pressure supply line is in fluid contact with the regulator chamber and said issue line is in fluid contact with one of the control chamber and the regulator chamber.

2. The pressure metering and regulating device according to claim 1, wherein said regulator chamber and said control chamber each comprise at least one pressure exposable diaphragm and wherein said diaphragms are arranged in a side by side relationship in parallel planes displaced from each other.

3. The pressure metering and regulating device according to claim 2 wherein said diaphragms are parallel to a bottom face plane of said case and comprising actuation means located on an upper face of said case for said control means, wherein said control chamber at least one diaphragm is displaced towards said bottom face of said case and said regulator chamber at least one diaphragm is displaced towards said upper face of said case and wherein said diaphragms can be mounted from the respective one of said faces.

4. The pressure metering and regulating device according to claim 2 wherein said control means comprise an axially adjustable turning screw for acting on said at least one control chamber diaphragm connected with said respective valve, wherein for actuation of said control means on the top face of said case there is provided a rotating knob arranged axially parallel and axially fixed near the axis of said turning screw and being connected therewith by a reduction gear.

5. The pressure metering and regulating device according to claim 1 further comprising a central measurement selector switch and a pressure measurement means and wherein two independent pressure regulators are provided, arranged side by side in said case, whereby their respective line pressure supply lines face the connection carrying side of the device and their issue lines face said central measurement selector switch, by which each of said pressure regulators can be connected to said pressure measurement means.

6. The pressure metering and regulating device according to claim 5, wherein for both pressure regulators there is provided a common line pressure connection comprising a safety valve, and that a separate connection for regulated pressure is provided for each pressure regulator.

7. The pressure metering and regulating device according to one of claims 5 and 6, characterized in that said measurement selector switch comprises a position for direct connection of at least one pressure measurement connection to said pressure measurement means, whereby said pressure measurement connection comprises a safety valve.

8. The pressure metering and regulating device according to claim 5 wherein said pressure regulators are adjustable for different adjoining pressure ranges.

9. The pressure metering and regulating device according to claim 1 further comprising a pressure measuring means including a transducer and a display unit which are formed as a replaceable unit and are detachably arranged in said case.

10. The pressure metering and regulating device according to claim 1 wherein said case is formed by a solid box-shaped block, whereby said valve chambers and their respective pressure lines are formed by recesses provided in said block.

11. A pressure metering and regulating device having a case formed in a solid block, comprising:
 (a) at least one pressure regulator unit including:
  a first valve chamber,
  a second valve chamber, and,
  a manually operated control means for adjusting the regulated pressure;
 (b) a line pressure inlet connection connected to said at least one pressure regulator unit;
 (c) at least one regulated pressure outlet connection connected to said at least one pressure regulator unit; and,
 (d) a pressure transducer connectible to said at least one regulated pressure output connection, wherein said first valve chamber comprises a first diaphragm means (16,19) separating said first valve chamber (22) into an input pressure chamber (14), connected via a pressure delaying nozzle (17) to said line pressure inlet connection, and a regulator chamber connectible to said line pressure inlet connection via a first valve (1), said first diaphragm means acting on said first valve to displace the same from a first into a second position, when the pressure in said input pressure chamber exceeds the pressure in said regulator chamber, wherein said first valve in its first position opens said regulator chamber to a vent (AL) and in its second position connects the same to said line pressure inlet connection, said second valve chamber (7) housing a second valve (6), via which said regulator chamber and said input pressure chamber are connectible, said second valve being biased by a second diaphragm means (8) which is loaded from one side by an adjustable force provided by said manually operated control means and from its other side by the pressure of said regulator chamber (22), said second valve being opened when the regulator chamber pressure exceeds said adjustable force, wherein said first valve chamber (22) is recessed in a top surface of said solid block and said second valve chamber (7) is recessed in a bottom surface of said solid block, said valve chambers further being arranged in a side by side relationship, each of said valve chambers being sealed against the environment by means of a respective removeable cover plate (5,10) having an outer surface aligned with the respective top or bottom surface of said solid block, and wherein said first and second diaphragm means are each held in place within the respective valve chamber by means of the respective cover plate.

12. A pressure metering and regulating device as defined in claim 11, wherein said manually operated control means comprise:
 a regulator spring arranged for acting on said second diaphragm means;
 an axially displaceable screw for adjusting the tension of said regulator spring; and,
 a cam with a knob projecting from said top surface of said solid block operable to turn said screw, said regulator spring and said screw being arranged coaxially between said second diaphragm and the top surface of said solid block and said cam being pivoted in a section of said solid block located between said first and second valve chambers.

13. A pressure metering and regulating device as defined in claim 11 or 12, wherein each of said first and second diaphragm means extends in a plane parallel to said top and bottom surfaces of said solid block, the first diaphragm means being located closer to said top surface and said second diaphragm means being located closer to said bottom surface than to said top surface.

14. A pressure metering and regulating device as defined in claim 11, wherein said case is substantially box-shaped, having, in addition to said top and bottom surfaces, four side walls, wherein all the pressure inlet and outlet connections end at one of said side walls, said device comprising two of said pressure regulator units, arranged side by side with respect to the connection bearing side wall within said solid block, and further comprising a selector switch having three positions, which selector switch is arranged at a side of the pressure regulators opposite to the connection bearing wall to selectively connect said pressure transducer with one of said pressure regulators and with a connection ending at said connection bearing wall.

15. The pressure metering and regulating device as defined in claim 14, wherein for both pressure regulator units there is provided a common line pressure connection comprising a safety valve, and that a separate connection for regulated pressure is provided for each pressure regulator.

16. The pressure metering and regulating device as defined in claim 14, wherein each of said pressure regulator units covers its own pressure range, wherein these two pressure ranges are adjoining so that the maximum value of the lower range substantially corresponds to the maximum value of the lower range substantially corresponds to the minimum value of the higher range.

17. The pressure metering and regulating device according to claim 11 wherein said pressure transducer comprises a display, said pressure transducer being formed as a removable unit located near a side wall opposite to said connection bearing side wall.

* * * * *